(12) United States Patent
Kannan et al.

(10) Patent No.: US 11,097,921 B2
(45) Date of Patent: Aug. 24, 2021

(54) ELEVATOR MOVEMENT PLAN GENERATION

(71) Applicant: International Business Machines Corporation, Armonk, NY (US)

(72) Inventors: Aswin Kannan, Chennai (IN); Krishnasuri Narayanam, Bangalore (IN); Ramasuri Narayanam, Bangalore (IN); Mukundan Sundararajan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 655 days.

(21) Appl. No.: 15/949,942

(22) Filed: Apr. 10, 2018

(65) Prior Publication Data

US 2019/0308844 A1 Oct. 10, 2019

(51) Int. Cl.
*B66B 1/24* (2006.01)
*G05B 13/02* (2006.01)
(Continued)

(52) U.S. Cl.
CPC .............. *B66B 1/2458* (2013.01); *B66B 1/28* (2013.01); *B66B 1/468* (2013.01); *B66B 3/002* (2013.01); *B66B 5/0012* (2013.01); *G05B 13/021* (2013.01); *B66B 1/3476* (2013.01); *B66B 2201/215* (2013.01); *B66B 2201/222* (2013.01);
(Continued)

(58) Field of Classification Search
CPC . B66B 1/2458; B66B 2201/211; B66B 1/468; B66B 2201/103; B66B 2201/222; B66B 2201/4653; B66B 2201/402; B66B 2201/102; B66B 2201/403; B66B 2201/4615; B66B 5/0012
See application file for complete search history.

(56) References Cited

U.S. PATENT DOCUMENTS

| 5,644,111 A | 7/1997 | Cerny et al. |
| 6,257,373 B1 | 7/2001 | Hikita et al. |
(Continued)

FOREIGN PATENT DOCUMENTS

| CN | 1919712 A | 2/2007 |
| CN | 101676188 A | 3/2010 |
| CN | 101723208 A | 6/2010 |

*Primary Examiner* — Marlon T Fletcher
(74) *Attorney, Agent, or Firm* — Ference & Associates.LLC

(57) ABSTRACT

One embodiment provides a method for optimizing schedules of a plurality of elevators in a building having a plurality of floors, including: receiving, from a user, an indication requesting that an elevator from the plurality of elevators stop at a particular floor, wherein each of the plurality of elevators has a schedule comprising floors where the elevator will stop; identifying the number of users in the elevator waiting area of each of the particular floors where an indication requesting a stop has been received; and updating, in view of the identified number of users at each of the particular floors, the schedule for the plurality of elevators to optimize the stops for the plurality of elevators, wherein the updating comprises dynamically routing the plurality of elevators upon (i) receipt of indications and (ii) identification of the number of users at each of the particular floors.

18 Claims, 4 Drawing Sheets

(51) Int. Cl.
  *B66B 1/46* (2006.01)
  *B66B 3/00* (2006.01)
  *B66B 5/00* (2006.01)
  *B66B 1/28* (2006.01)
  *B66B 1/34* (2006.01)
(52) U.S. Cl.
  CPC ..... *B66B 2201/23* (2013.01); *B66B 2201/233* (2013.01); *B66B 2201/4638* (2013.01); *B66B 2201/4653* (2013.01)

(56) References Cited

U.S. PATENT DOCUMENTS

| | | | |
|---|---|---|---|
| 8,020,672 B2 | 9/2011 | Lin et al. | |
| 8,210,321 B2* | 7/2012 | Finschi | B66B 1/14 187/388 |
| 9,463,953 B2 | 10/2016 | Lee et al. | |
| 2008/0292140 A1* | 11/2008 | Morris | G06K 9/00295 382/103 |
| 2009/0057068 A1* | 3/2009 | Lin | B66B 1/468 187/392 |
| 2013/0048436 A1* | 2/2013 | Chan | B66B 1/2408 187/387 |
| 2014/0152836 A1* | 6/2014 | Morris | G06T 7/292 348/159 |
| 2015/0090535 A1* | 4/2015 | Nakagawa | B66B 1/2458 187/387 |
| 2015/0096843 A1* | 4/2015 | Siddiqui | B66B 1/2458 187/380 |
| 2019/0002234 A1* | 1/2019 | Shinohe | B66B 1/28 |
| 2019/0193988 A1* | 6/2019 | Huang | B66B 1/468 |
| 2019/0300327 A1* | 10/2019 | Stanley | B66B 1/28 |
| 2019/0308844 A1* | 10/2019 | Kannan | B66B 5/0012 |
| 2019/0382235 A1* | 12/2019 | Pahlke | B66B 1/28 |
| 2019/0389689 A1* | 12/2019 | Jia | B66B 1/3476 |
| 2020/0130993 A1* | 4/2020 | Scoville | B66B 1/468 |
| 2020/0239268 A1* | 7/2020 | Scoville | B66B 1/3476 |
| 2020/0262679 A1* | 8/2020 | Simcik | B66B 1/468 |
| 2020/0307950 A1* | 10/2020 | Sudi | B66B 3/00 |

* cited by examiner

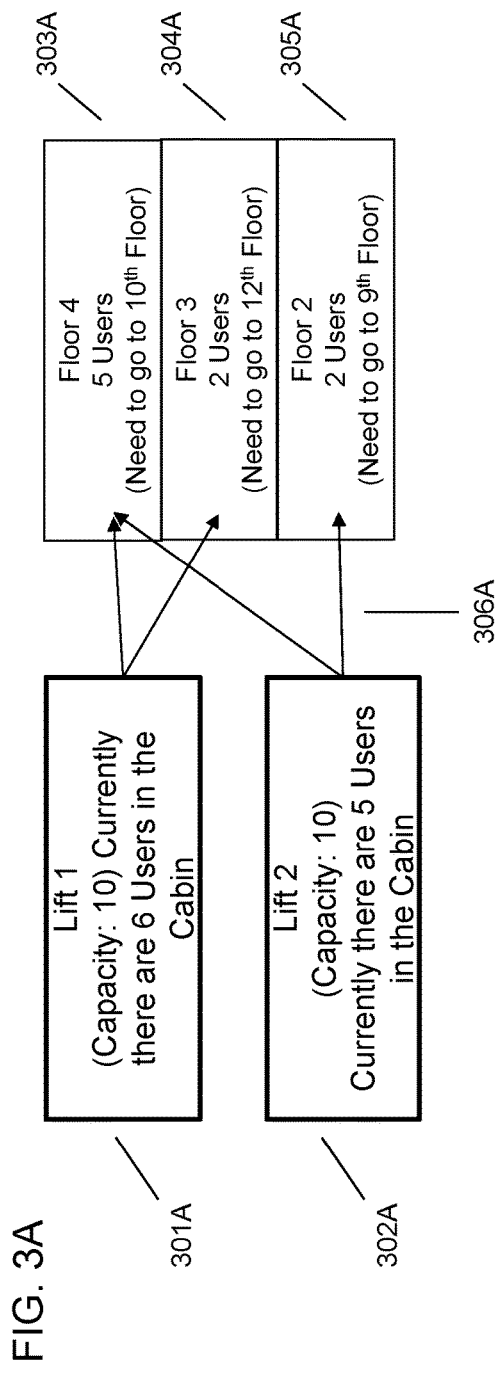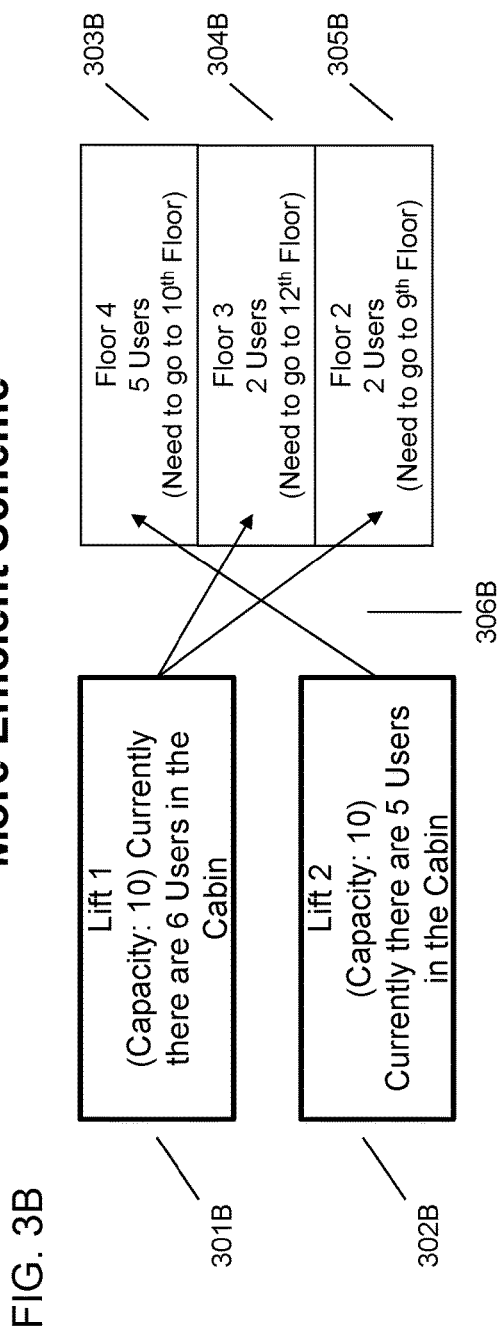

ELEVATOR MOVEMENT PLAN GENERATION

BACKGROUND

Many buildings have multiple floors. Therefore, the building has to have at least one mechanism that allows people to move between the different floors of the building. Most, if not all, buildings provide stairs that can be traversed to move between the different floors. However, stairs may be difficult for some people to traverse or some people may not want to use the stairs for a variety of reasons. Thus, many buildings provide a mechanism for moving people between the floors that do not require a person to traverse the stairs, for example, escalators or elevators (also called lifts). Elevators are particularly popular in buildings that have many floors, for example, more than two floors. The elevators provide a transportation mechanism that allows for a user to quickly move between many different floors.

BRIEF SUMMARY

In summary, one aspect of the invention provides a method, comprising: receiving, from a user in an elevator waiting area of a particular floor of a building, input requesting that an elevator stop at the particular floor; adding the particular floor to a stop schedule for the elevator; receiving input that the user has left the elevator waiting area before the elevator has stopped at the particular floor, thereby resulting in no users in the elevator waiting area; and removing, responsive to receiving the input that the user has left, the particular floor from the stop schedule before the elevator stops at the particular floor.

Another aspect of the invention provides a method for optimizing schedules of a plurality of elevators in a building having a plurality of floors, comprising: receiving, from a user, an indication requesting that an elevator from the plurality of elevators stop at a particular floor, wherein each of the plurality of elevators has a schedule comprising floors where the elevator will stop; identifying the number of users in the elevator waiting area of each of the particular floors where an indication requesting a stop has been received; and updating, in view of the identified number of users at each of the particular floors, the schedule for the plurality of elevators to optimize the stops for the plurality of elevators, wherein the updating comprises dynamically routing the plurality of elevators upon (i) receipt of indications and (ii) identification of the number of users at each of the particular floors.

An additional aspect of the invention provides an apparatus for optimizing schedules of a plurality of elevators in a building having a plurality of floors, comprising: at least one processor; and a computer readable storage medium having computer readable program code embodied therewith and executable by the at least one processor, the computer readable program code comprising: computer readable program code configured to receive, from a user, an indication requesting that an elevator from the plurality of elevators stop at a particular floor, wherein each of the plurality of elevators has a schedule comprising floors where the elevator will stop; computer readable program code configured to identify the number of users in the elevator waiting area of each of the particular floors where an indication requesting a stop has been received; and computer readable program code configured to update, in view of the identified number of users at each of the particular floors, the schedule for the plurality of elevators to optimize the stops for the plurality of elevators, wherein the updating comprises dynamically routing the plurality of elevators upon (i) receipt of indications and (ii) identification of the number of users at each of the particular floors.

A further aspect of the invention provides a computer program product, comprising: a computer readable storage medium having computer readable program code embodied therewith, the computer readable program code executable by a processor and comprising: computer readable program code configured to receive, from a user in an elevator waiting area of a particular floor of a building, input requesting that an elevator stop at the particular floor; computer readable program code configured to add the particular floor to a stop schedule for the elevator; computer readable program code configured to receive input that the user has left the elevator waiting area before the elevator has stopped at the particular floor, thereby resulting in no users in the elevator waiting area; and computer readable program code configured to remove, responsive to receiving the input that the user has left, the particular floor from the stop schedule before the elevator stops at the particular floor.

A further aspect of the invention provides a computer program product for optimizing schedules of a plurality of elevators in a building having a plurality of floors, comprising: a computer readable storage medium having computer readable program code embodied therewith, the computer readable program code executable by a processor and comprising: computer readable program code configured to receive, from a user, an indication requesting that an elevator from the plurality of elevators stop at a particular floor, wherein each of the plurality of elevators has a schedule comprising floors where the elevator will stop; computer readable program code configured to identify the number of users in the elevator waiting area of each of the particular floors where an indication requesting a stop has been received; and computer readable program code configured to update, in view of the identified number of users at each of the particular floors, the schedule for the plurality of elevators to optimize the stops for the plurality of elevators, wherein the updating comprises dynamically routing the plurality of elevators upon (i) receipt of indications and (ii) identification of the number of users at each of the particular floors.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 3A illustrates an example of a less efficient elevator movement scheme.

FIG. 3B illustrates an example of a more efficient elevator movement scheme.

DETAILED DESCRIPTION

Figure 1:
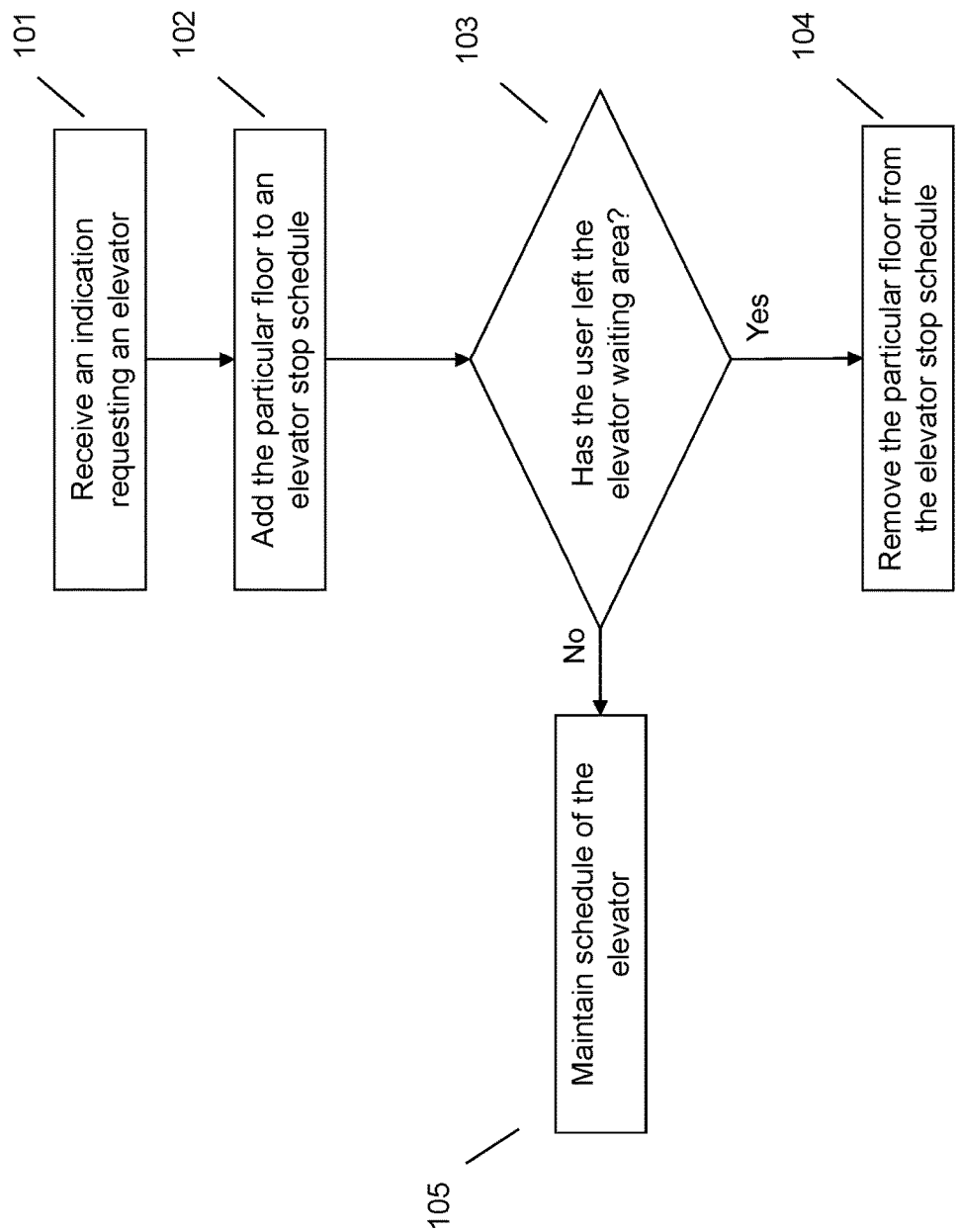
FIG. 1 illustrates a method of cancelling a schedule request based upon a user leaving the elevator waiting area.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

While elevators or lifts are a useful mechanism for quickly moving people between multiple floors of a building, elevators do have limitations. One limitation is that an elevator can only carry so many people at one time, for example, the elevator might have a number or weight capacity. Additionally, it takes time for the elevator to move between floors, particularly if the elevator has to stop at many floors to either allow people to exit the elevator or to allow more people to enter the elevator. Thus, a person waiting for an elevator at one floor may have to wait for a significant amount of time before the elevator arrives. Additionally, the riding time of a person who is riding the elevator to reach the desired floor increases every time the elevator makes a stop.

Traditional solutions have been to provide more than one elevator, also referred to as an elevator bank. Having more than one elevator alleviates the demand on a single elevator and allows for quicker movement of people between floors. For example, one elevator may travel up the floors, while the other elevator is traveling down the floors. Thus, the people who need to go up to get to the desired floor would enter the elevator going up and people who need to go down to get to the desired floor would enter the elevator going down. Additionally, since the elevators are traveling in a single direction, the elevator only makes stops at either a floor where someone has requested an elevator going that direction or at a floor corresponding to the destination of at least one of the riders on the elevator. While such a solution reduces some of the waiting time and riding time of people, it may still take a very long time until an elevator arrives for a person. Additionally, even if an elevator does arrive, it may be too full for every person to get on the elevator, for example, at popular floors. This means that some people have to wait for the next elevator, which may also be full.

Thus, another solution is to provide an elevator bank where each elevator only travels to certain floors. For example, in buildings that have a large number of floors, one or more elevators may travel from the main or ground floor and any floor between one and twenty. Another elevator or group of elevators may then travel from the main or ground floor and any floor between twenty-one and forty, and so on. Using this technique, the riders of the elevators have a reduced number of floors as stopping locations for the elevator, thereby reducing the amount of waiting and riding time for a single person. However, while this technique reduces the amount of waiting and riding time, it may still take a significant length of time before a user can get to his/her destination floor. Additionally, this technique does not prevent the problem regarding elevators stopping at floors when the elevator is at capacity or will be over capacity if all people who want to ride the elevator at a particular floor enter the elevator.

Accordingly, the techniques and systems as described herein provide a system and technique for scheduling elevators based upon a number of users that are waiting for an elevator at a particular floor. The system may receive an indication of a user requesting that an elevator stop at a particular floor. For example, the user may press the elevator call button. As another example, a user may have an elevator application on a mobile device (e.g., smart phone, tablet, laptop computer, smart watch, augmented or virtual reality system, etc.) and may use the application to provide a request for an elevator. As a final example, the system may be able to identify different users who enter a waiting area and access information sources regarding the user that may indicate that the user will need an elevator at a particular time and at a particular floor.

Based upon the indications, the system may update a schedule for the plurality of elevators. The system may then identify a number of users at an elevator waiting area of a particular floor and create a plan or schedule based upon the identified number of users. For example, the system may determine that a user was at a floor and requested an elevator and then decided to leave the elevator waiting area. Based upon identifying that no users are at the elevator waiting area, the system may update a schedule of the elevator that cancels the request for an elevator to stop at that floor, thereby preventing an unnecessary stop of the elevator.

As another example, the system may optimize the schedules of the elevators based upon the number of users waiting at different floors of the building. This optimization may include scheduling one elevator to skip stopping at one floor that has waiting users and instead stop at another floor where the number of users would maximize use of the capacity of the elevator. The system may then send a different elevator to pick up the users at the skipped floor. The system may also optimize the schedules of the elevators based upon known or probable destination locations of riders. For example, if the system knows that a group of users is likely to stop at a particular floor that has a number of waiting users that would put the elevator over capacity, the schedule may include having the elevator still pick up the original passengers because enough passengers are likely to exit the elevator to make the number of passengers within capacity when the elevator was ready to move to another floor. Thus, the system provides techniques for optimizing the schedules between the plurality of elevators to minimize waiting and riding time of the users, maximize use of the capacity of the elevators, and reduce overall resource utilization.

Such a system provides a technical improvement over current systems for elevator scheduling. The systems and methods as described herein provide a technique for scheduling elevators that reduces the overall wait time and riding time of people using the elevators, particularly over conventional elevator scheduling techniques. Instead of making stops at every floor that is requesting an elevator, the system optimizes a schedule of stops for the plurality of elevators based upon a number of people waiting for the elevator at different floors within the building and a capacity of the elevator. Additionally, the systems and methods as described herein can use predictions regarding the destination floors of the user to optimize the schedule for the elevators. Additionally, the systems and methods described herein provide a technique for identifying if a person who requested an elevator is no longer in the elevator waiting area and cancelling the request for the elevator to that floor, thereby preventing stops at floors where no one is waiting. Thus, the described systems and methods provide a technique that minimizes waiting and riding time for elevator passengers, reduces stops to floors when the elevator is at capacity, and prevents unnecessary stops by the elevator at floors with no one waiting, thereby achieving benefits over traditional elevator scheduling techniques.

Figure 2:
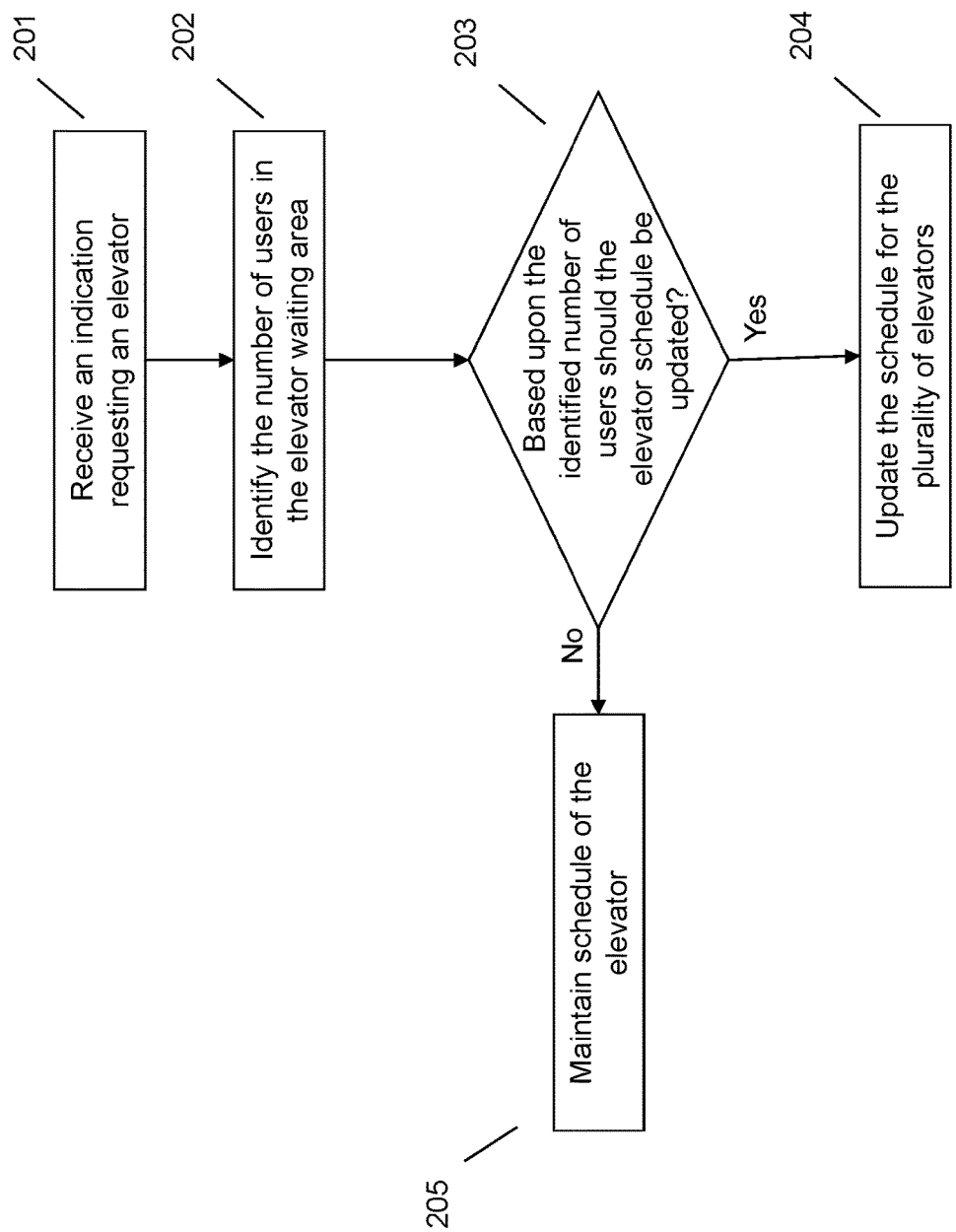
FIG. 2 illustrates a method of optimizing schedules for a plurality of elevators based upon a number of users waiting for the elevator.

FIG. 1 illustrates a method for removing a floor from a schedule of an elevator in view of no users remaining within the elevator waiting area. FIG. 2 illustrates a method for optimizing scheduling a plurality of elevators based upon an identified number of users within an elevator waiting area of a particular floor. At either 101 or 201 the system may receive an indication of a user requesting an elevator to stop at a particular floor of a building that has a plurality of floors.

An indication of a request for an elevator may be provided using a variety of different techniques. For example, a user in a waiting area for an elevator, for example, an elevator lobby, may press a call button that sends a signal that an elevator has been requested at that floor. As another example, the elevator scheduling system may access video image information of the elevator waiting areas to determine if a person has arrived in the waiting area. Using this information, the system may then automatically provide a request for an elevator, thereby eliminating the need for the user to provide a request using the call button.

As another example, a user may have an elevator application installed on a mobile or portable device (e.g., smart phone, tablet, smart watch, laptop computer, etc.). This elevator application may allow the user to select an icon, press a button, or otherwise provide a selection within the application that indicates the user is requesting an elevator. The input by the user into the application may also allow the user to indicate a floor where the user wants to be picked up, and may also allow a user to indicate a destination floor. The request for the elevator may be then communicated from the mobile device to the elevator scheduling system. Additionally, rather than requesting the user to provide information regarding the pick-up floor, the system (either the user's system or the elevator scheduling system) may provide information that allows for identification of the pick-up floor. For example, the user's mobile device may transmit location information that the elevator system may then use to determine the user's current location and then identify a floor associated with that location, for example, a floor closest to the current location of the user.

As another example, the system may identify a user or a schedule of users who frequents the elevator. For example, if a building includes an individual access system, the individual access system may identify when a person has entered the building (e.g., determined based upon access to the building or other area using an access badge, etc.) or when a person generally enters the building. Based upon either the indication that a person has already entered the building or the possible schedule of the individual, the system may provide an indication for request so that an elevator is waiting for, or on the way to, the individual when the individual reaches the elevator waiting area, without the individual having to provide an elevator request using another method.

At 102 the system may add the particular floor to a schedule of an elevator. This addition results in scheduling the elevator to stop at the particular floor associated with the indication. Although not identified in FIG. 2, the indication received at 201 will also generate a request for an elevator to stop at a particular floor, which then results in the floor being added to the schedule for at least one of the plurality of elevators. Due to the fact the requests are or can be received from a plurality of floors within the building, the system may receive a plurality of schedule requests for floors where an elevator has been requested to stop. Generating a schedule request may include adding the floor to a list of floors where an elevator has been requested to stop. The schedule request may also include an indication of the direction of travel corresponding to the request. For example, the schedule request may indicate that the user providing the request wants to travel up or down with respect to the floor of pick-up. Additionally, the schedule request may include an indication of a probable or likely destination floor of the user. Determination of a probable destination floor of a user will be described in more detail below. Thus, based upon the schedule request, the elevator scheduling system will be made aware of a floor that needs to be serviced by an elevator.

At 103 the system may determine whether the user has left the elevator waiting area, thereby resulting in no users being at the elevator waiting area. At 202 the system may attempt to identify the number of users in the elevator waiting areas of each of the particular floors where an indication to stop has been received. At either 103 or 202 to determine the number of users within a waiting area, the system may access one or more secondary sources of information. For example, the system may access video image information that corresponds to an elevator waiting area of a particular floor. For example, the building may include still image or video cameras at each of the elevator waiting areas. Therefore, the system may access the video feed or still image frames from each of the elevator waiting areas. The system may then use one or more image parsing techniques to parse the image(s) to identify one or more individuals that are currently at the elevator waiting area of a particular floor. The system may specifically identify one or more individuals, for example, using facial recognition techniques, by comparing an image to a database of known individuals, or the like. Additionally or alternatively, the system may merely identify a number of individuals in the image. Whether the system specifically identifies individuals or merely determines a number of individuals, or a combination thereof, the system is able to determine a number of individuals at the elevator waiting area of a particular floor from the image information.

The system may also use information derived from the elevator application discussed above to determine a number of users that are currently at an elevator waiting area of a particular floor. For example, the system may receive location information from the mobile device through the elevator application that indicates that a user is located within the elevator waiting area of a particular floor. As another example, if the user provided a future request (e.g., the user indicated a particular time that he/she would need the elevator at a particular floor, etc.), the user may then provide an indication within the elevator application when the user arrives at the elevator waiting area. This indication can then be used by the system to determine that the user is within the elevator waiting area of a particular floor.

The system may also use information derived from identification of a particular user. For example, in the case where the user accessed the building or an area using an access badge, the system can determine how long it will take the user to reach the elevator bank and then add this person to the number of users at the elevator waiting area when this person is predicted to arrive at the elevators waiting area. As another example, if a user has to use the access badge to access a particular floor, when the user provides the badge access at the elevator waiting area, the system may use this badge access to add the user to the number of users waiting at the elevator waiting area for an elevator. Other methods for determining a number of users are possible and contemplated. Additionally, a combination of methods for determining a number of users within an elevator waiting area can be used.

If the system determines that users are currently at an elevator waiting area for a particular floor at 103, the system may maintain the schedule of the elevator at 105. In other words, the system will keep the particular floor on the schedule so that an elevator will stop at the floor. If, however, the system determines that no users are currently at the elevator waiting area at 103, the system may remove the particular floor from the elevator stop schedule at 104. In other words, if the user leaves the elevator waiting area after providing a request for an elevator, the system may cancel the request and remove the particular floor from the stop schedule if no additional users are within the elevator waiting area. Cancelling the request may also include clearing any indications associated with the request. For example, if a user pressed an elevator call button, an indication may be presented that indicates that the elevator call button was pressed, for example, a light associated with the elevator call button, an indication on a display screen, or the like. In the event that the system cancels the call request, the system may also clear the indication so that another user entering the area will not think that an elevator has already been requested to stop at the particular floor.

Referring to FIG. 2, once the number of users at floors that have an elevator request associated with them has been identified at 202, the system may determine whether the elevator schedule should be updated based upon the identified number of users at 203. The system may determine whether the schedule should be updated based upon determining if a change has occurred that would require a new schedule. For example, if a received request does not change the schedule of the elevators, the system may determine that the schedules do not need to be updated. As another example, if the system does not receive a new request and the number of identified users does not change, the system may determine that the schedules do not need to be changed. As a contrasting example, if the received indication or the identified number of users indicates that a change is necessary, the system may determine that the schedules do need to be changed. If the system determines that no changes to the schedule are required the system may maintain the schedule of the elevators at 205.

If, however, the system determines that changes are necessary, the system may update the schedule for the plurality of elevators at 204. Updating the schedule is a dynamic process that can occur as the elevators are moving between floors. In other words, even if the elevators are already on a particular path, the system may modify the elevator schedules. Thus, the system as described herein provides a technique for dynamically routing the elevators in response to receiving information that necessitates the change. The type of information that may necessitate a change may include information that allows for a more optimized schedule for the elevators. Thus, in updating the schedule the system attempts to optimize the stops for each of the plurality of elevators to meet the desired objectives. Optimization of the schedules may be based upon the capacity of the elevators, the identified number of users at particular floors, a predicted destination of users, the number of users currently on the elevator, and/or the like.

The optimized schedule of stops for each of the elevators takes into account the other elevators and possible stops for those other elevators. An optimized schedule may include a schedule that minimizes an overall waiting time for users, minimizes an overall ride time for users (e.g., by reducing the number of stops by each elevator), minimizes an overall number of stops for the plurality of elevators, and reduces an overall resource utilization or cost of operation. The optimized schedule may be based upon the number of users waiting at each of the floors that have an associated elevator stop request. The optimized schedule may also be based upon a capacity of each of the plurality of elevators.

As an example, FIG. 3A and FIG. 3B illustrate the difference between conventional scheduling techniques and the described scheduling techniques. Both FIG. 3A and FIG. 3B use the same set of starting parameters. A first elevator or lift 301A and 301B has a capacity of 10 passengers and currently has 6 passengers in the lift cabin. A second elevator or lift 302A and 302B has a capacity of 10 passengers and currently has 5 passengers in the lift cabin. The system has received an elevator request from Floor 2 305A and 305B corresponding to 2 users who need to go to the $9^{th}$ floor. The system has also received an elevator request from Floor 3 304A and 304B corresponding to 2 users who need to go to the $12^{th}$ floor. Finally, the system has also received an elevator request from Floor 4 303A and 303B corresponding to 5 users who need to go to the $10^{th}$ floor. This example assumes that both Lift 1 301A and 301B and Lift 2 302A and 302B start at the ground floor.

FIG. 3A illustrates a less efficient scheduling scheme for a plurality of elevators. Such a less efficient scheduling scheme may be produced using conventional elevator scheduling techniques, for example, by each elevator stopping at a floor where a request has been received regardless of other information. Using the conventional scheduling techniques and illustrated by the arrows 306A, Lift 2 302A goes to Floor 2 305A and picks up the 2 users, thereby bringing the total number of users on Lift 2 302A to 7 users. Since all the users have been picked up from Floor 2 305A, Lift 1 301A skips Floor 2 305A and goes straight to Floor 3 304A and picks up the 2 users on this floor, bringing the total number of users in Lift 1 301A to 8 users. Lift 2 302A then skips Floor 3 304A, since all users have been picked up that floor. Lift 2 302A stops at Floor 4 303A. However, since Lift 2 302A currently has 7 users on in the lift cabin and a capacity of 10 users, only 3 of the users on Floor 4 303A can be picked up using Lift 2 302A. Therefore, Lift 1 301A also has to stop at Floor 4 303A to pick up the remaining 2 passengers. Conversely, if Lift 1 301A is the lift that first stops at Floor 4 303A, only 2 of 5 passengers could be picked up by Lift 1 301A because Lift 1 301A had 8 passengers on board. Therefore, both Lift 1 301A and Lift 2 302A have to stop at Floor 4 303A. Thus, the number of total stops for both lifts is 4. Additionally, both sets of original passengers had to wait for two stops additional to the planned destination stop. Finally, at least a portion of the passengers at Floor 4 303A had to wait for a second lift, thereby increasing the wait time of those passengers.

On the other hand, FIG. 3B illustrates a schedule created using the techniques described herein. Since the system knows that there are currently 6 users in the cabin of Lift 1 301B and 5 users in the cabin of Lift 2 302B, the system attempts to optimize the scheduled stops for each of these lifts based upon the number of users waiting at each stop. Thus, since the two lifts have a total capacity of 30 users between them, 10 users are currently on the two lifts, and 10 users are currently waiting on lifts, the system attempts to optimize the stops that are needed in order to pick up all these passengers. Lift 2 302B could pick up the passengers at both Floor 2 305B and Floor 3 304B, but Lift 1 301B cannot pick up all 5 passengers on Floor 4 303B, so both Lift 1 301B and Lift 2 302B would have to stop at Floor 4 303B if Lift 1 301B has to stop at Floor 4. However, Lift 1 301B can pick up both sets of passengers at Floor 2 305B and Floor 3 304B, and Lift 2 302B can accommodate all the passengers on Floor 4 303B.

Accordingly, at illustrated by the arrows 306B, Lift 2 302B bypasses Floor 2 305B and Floor 3 304B and instead stops only at Floor 4 303B and picks up the 5 passengers at this floor, thereby bringing the passenger count of Lift 2 302B to its capacity of 10. Lift 1 301B then stops at both Floor 2 305B to pick up those 2 passengers and Floor 3 304B to pick up those 2 passengers, also bringing the passenger count of Lift 1 301B to its capacity of 10. Therefore, like the conventional technique, all passengers were picked up using the two lifts. However, using the optimized scheduling, only three total stops had to be made by the two lifts, as opposed to the four stops of the conventional technique. Additionally, the overall wait time of both the passengers riding the two lifts and waiting for the lifts was reduced.

The optimized schedule may be additionally based upon a probable or likely destination of one or more users waiting at a particular floor. Predicting a probable or likely destination may be based upon information received from the passengers. For example, the passenger may provide an indication of a probable destination floor, for example, using the elevator application, using an access badge, or the like. Predicting a probable destination may also be based upon historical information regarding one or more passengers. Thus, the system may identify one or more individuals who are within an elevator waiting area and store information regarding destinations of the identified users at particular times. For example, if one user typically travels from one floor to another floor at a particular time, the system may, upon identifying that the individual is in the elevator waiting area at the particular time, predict that the user will travel to the same floor that the user has previously traveled to.

The system may also use a prediction model to determine a group of individuals within an elevator waiting area that may wish to travel on a single elevator together. This prediction may be based upon information that more than one individual entered the elevator waiting area at the same time, thereby possibly identifying that the individuals are a cohesive group. The system may also use one or more sensors (e.g., image capture sensors, audio capture sensors, etc.) to identify that a group of individuals appear to be standing together, talking among themselves, or performing another activity that indicates the individuals are a group. The prediction may also be based upon historical information. For example, if a group of individuals always enter an elevator together, the system may, upon identifying that the group of individuals is in the waiting area together, group the individuals as a cohesive group.

Using the known information (e.g., number of users in an elevator waiting area, identification of individuals, etc.) and/or the predicted information (e.g., predicted destination, predicted cohesive groups, etc.) the system may optimize the schedules of the elevators. The optimized schedules may be based upon the number of users at each floor, whether users within the waiting area should be treated as a cohesive group, if a destination floor is known or predicted, a capacity of each of the elevators, a combination thereof, or the like. The optimized schedules attempt to reduce the overall waiting time of the passengers waiting in an elevator waiting area, reduce the overall cost of operation (e.g., by reducing the number of overall stops of all the elevators, running the elevators in an efficient manner, etc.), minimizing an overall ride time for the passengers on the elevators, and ensure that all customers are served. It should also be noted that the schedule can be modified based upon new input. For example, if a passenger enters the elevator and provides input of a destination floor that is different from the predicted or previously indicated destination floor, the system may re-optimize the schedule based upon this new information. As another example, if a user leaves the elevator at a floor that is different from the indicated destination floor, the system may re-optimize the schedule based upon this new information.

To optimize the schedules the system may use an optimization algorithm. The optimization algorithm may use as inputs the number of waiting groups and respective sizes at each floor, number of independent individuals at each floor, predicted or probable destination of any users at each floor, the direction and current floor of each elevator, and any other inputs that may be received by the system. The optimization algorithm may also be subject to some constraints, for example, an elevator only stops at a single floor once per trip to avoid double costs, an elevator may only be traveling up from a current floor location and, therefore, only stops at floors where users are traveling to floors above the pick-up floor, an elevator may only be traveling down from a current floor location and, therefore, only stops at floors where users are traveling to floors below the pick-up floor, and the like. The constraints (which assume only two elevators, one going up and one going down, for simplicity but can be easily modified for more than two elevators) may be formulated using the following algorithms:

$$\sum_{t=1}^{T} r_i^t = 1, \text{ for all } i \in W_U \text{ and } \sum_{t=1}^{T} s_i^t = 1, \text{ for all } i \in W_D$$

where: $x^t$ indicates the current state or floor of the elevator going up as an integer;
$y^t$ indicates the current state or floor of the elevator going down as an integer;
$r_i^t$ is an indicator of whether the up-going elevator is at floor "i" at time "t", represented as 0 or 1; and
$s_i^t$ is an indicator of whether the down-going elevator is at floor "i" at time "t", represented as 0 or 1.
To make sure that the up-going and down-going elevators are at floor i at time t if the corresponding variables r and s are 1, then $x^t$ is set to i and $y^t$ is set to i and the constraints will be modeled as:

$$ir_i^t \leq x^t \leq i + (1 - r_i^t)M$$

$$is_i^t \leq y^t \leq i + (1 - s_i^t)M$$

The optimization algorithm may also use a deterministic algorithm to reduce elevator operational costs based upon stationary elevators having no cost, determining the expense of moving an elevator which is based upon the number of floors that are traversed, and the like.

The optimization algorithm can then use these inputs to meet the objectives as discussed above. For example, the algorithm for reducing the elevator operational costs may include:

$$c \sum_{t=1}^{T} (x^t - x^{t-1}) + c \sum_{t=1}^{T} (y^{t-1} - y^t)$$

where "c" is the unit cost coefficient. The algorithm for minimizing the mean waiting time of customers at all floors may include:

$$\sum_i \sum_{t=1}^{T} t p_i r_i^t + \sum_i \sum_{t=1}^{T} t q_i s_i^t$$

where: $p_i$ is the number of people waiting (going up) at floor i
$q_i$ is the number of people waiting (going down) at floor i $d_j^i$ is the number of people waiting at floor j going up to floor i
$e_j^i$ is the number of people waiting at floor j going down to floor i
The algorithm for smarter alignment based on destination may include:

$$\sum_i \sum_j \sum_{t=1}^{T} t p_i d_j^i r_i^t + \sum_i \sum_j \sum_{t=1}^{T} t q_i e_j^i s_i^t$$

Therefore, the full optimization formulation may be:

$$\min_{x,y,r,s} \alpha \left( c \sum_{t=1}^{T} (x^t - x^{t-1}) + c \sum_{t=1}^{T} (y^{t-1} - y^t) \right) +$$
$$\beta \left( \sum_i \sum_{t=1}^{T} t p_i r_i^t + \sum_i \sum_{t=1}^{T} t q_i s_i^t \right) +$$
$$\gamma \left( \sum_i \sum_j \sum_{t=1}^{T} t p_i d_j^i r_i^t + \sum_i \sum_j \sum_{t=1}^{T} t q_i e_j^i s_i^t \right)$$

Subject to:

$$\sum_{t=1}^{T} r_i^t = 1, \text{ for all } i \in W_U$$

$$\sum_{t=1}^{T} s_i^t = 1, \text{ for all } i \in W_D$$

$$ir_i^t \leq x^t \leq i + (1 - r_i^t)M$$
$$is_i^t \leq y^t \leq i + (1 - s_i^t)M$$
$$r, s \in \{0, 1\}$$
$$x, y \in \{1, 2, \ldots, m\}$$

Alpha ($\alpha$), beta ($\beta$), and gamma ($\gamma$) are weights/positive scalars. Beta ($\beta$) is significantly greater than gamma ($\gamma$). As discussed above, x and y are integer variables and r and s are binary variables. M is a huge positive scalar, for example, greater than 100,000.

The system may also prioritize one or more passengers waiting within an elevator waiting area, for example, a user may be an important user, the user may have an emergency that requires immediate elevator assistance, or the like. To prioritize the customer the system may weight the passenger. The prioritization may provide that this user will have a reduced wait or ride time as compared to a non-prioritized customer. If a user has a weighting and is prioritized, the weighting may be used in the optimization algorithm in order to reduce the overall wait or ride time for this particular user. A prioritization may also be based upon a number of users at a particular floor or a predicted destination of users. For example, if a group of individuals is traveling to a popular floor, the system may prioritize that group of individuals because the elevator will end up at the popular floor.

Once the system has generated an optimized schedule, the system may provide notifications to users at elevator waiting areas. For example, if an elevator stops at a floor but the schedule of the elevator does not correspond to the predicted destination of the user, the user will not want to enter the elevator. Accordingly, when an elevator arrives that has a schedule that corresponds to a particular user, the system may send a notification (e.g., using the elevator application, using a mobile notification, etc.) to the user indicating that the user should enter the elevator.

Thus the described systems and methods provide an elevator scheduling system that provides many benefits over traditional elevator scheduling systems. The systems and methods as described herein provide a technique that minimizes overall wait time of the customers, minimizes overall ride time of the customers, reduces overall operational costs, and prevents stopping at floors where a customer is no longer within the elevator waiting area.

Figure 4:
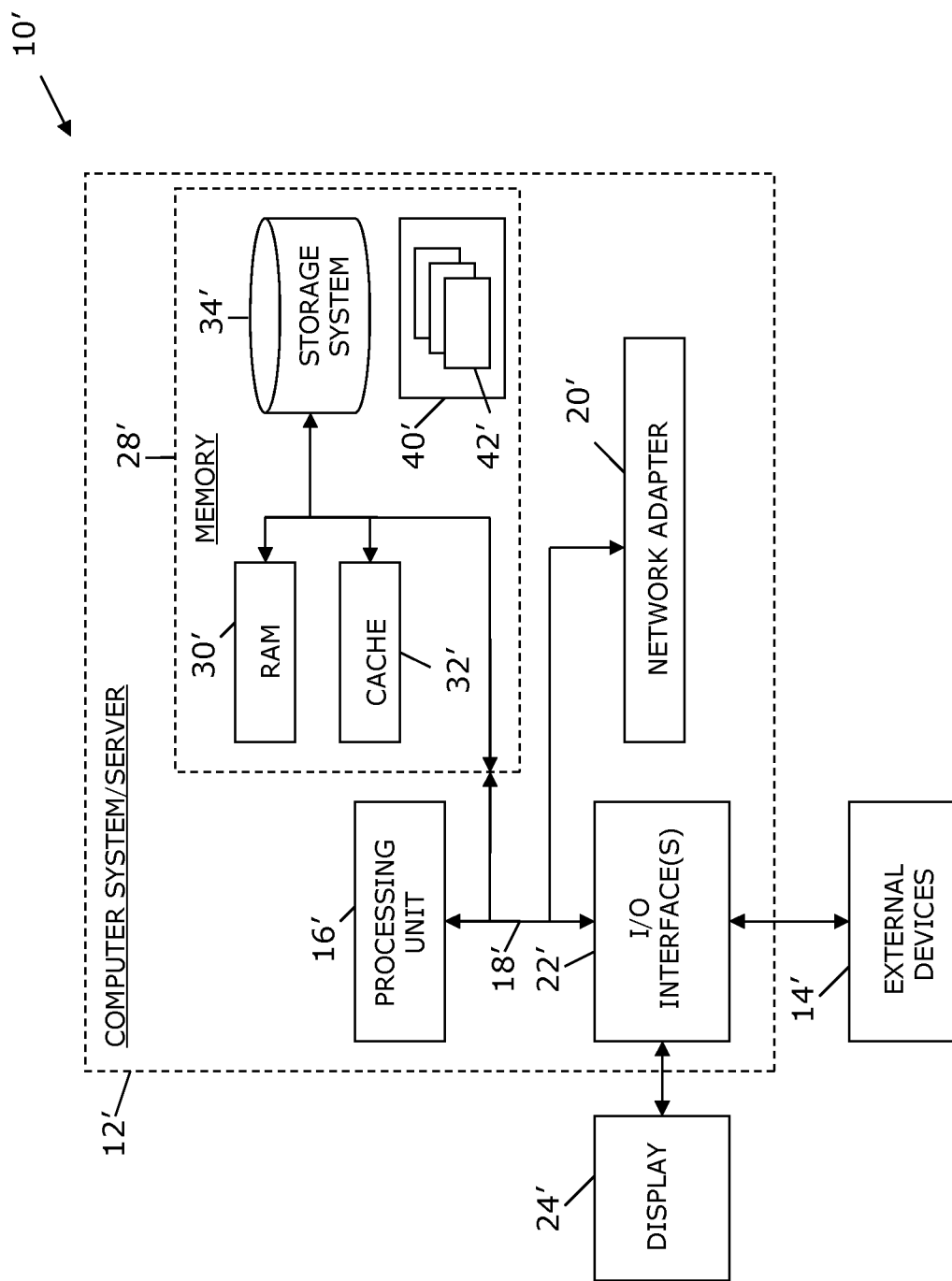
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, from a user in an elevator waiting area of a particular floor of a building, input requesting that an elevator stop at the particular floor, wherein the receiving comprises receiving, from an elevator application of a portable device, a request for the elevator, the request including information indicating the particular floor;
   adding the particular floor to a stop schedule for the elevator;
   receiving, after the particular floor has been added to the stop schedule for the elevator, input that the user has left the elevator waiting area before the elevator has stopped at the particular floor, thereby resulting in no users in the elevator waiting area; and
   removing, responsive to receiving the input that the user has left, the particular floor from the stop schedule before the elevator stops at the particular floor.

2. The method of claim 1, comprising:
   providing an indication within the elevator waiting area of the received input; and
   clearing the indication responsive to removing the particular floor from the stop schedule.

3. The method of claim 1, wherein the receiving input the user has left comprises (i) receiving video image data, (ii) parsing the video image data, and (iii) identifying, from the parsed video image data, that no user is in the elevator waiting area.

4. A method for optimizing schedules of a plurality of elevators in a building having a plurality of floors, comprising:
   receiving, from a user, an indication requesting that an elevator from the plurality of elevators stop at a particular floor, wherein each of the plurality of elevators has a schedule comprising floors where the elevator will stop;
   identifying the number of users in the elevator waiting area of each of the particular floors where an indication requesting a stop has been received; and
   updating, in view of the identified number of users at each of the particular floors, the schedule for the plurality of elevators to optimize the stops for the plurality of elevators, wherein the updating comprises dynamically routing the plurality of elevators upon (i) receipt of indications and (ii) identification of the number of users at each of the particular floors, wherein the dynamically routing occurs as the plurality of elevators are moving between floors and is further based upon (iii) the capacity of each of the plurality of elevators, (iv) the current number of users on each of the plurality of elevators, and (v) a schedule of another of the plurality of elevators.

5. The method of claim 4, wherein at least one of (i) the receiving an indication of a user and (ii) the identifying the number of users is based upon at least one of: mobile application information, video image data, and information determined based upon identification of the user.

6. The method of claim 4, wherein the updating a schedule comprises rescheduling floors where each of the plurality of elevators stops, thereby minimizing the number of stops for the plurality of elevators by transferring responsibility to stop at a particular floor from one of the plurality of elevators to another of the plurality of elevators.

7. The method of claim 4, wherein the updating a schedule comprises rescheduling floors where each of the plurality of elevators stops, thereby minimizing an overall wait time for the plurality of users by transferring responsibility to stop at a particular floor from one of the plurality of elevators to another of the plurality of elevators.

8. The method of claim 4, comprising identifying at least one user from the number of users and predicting a destination floor for the identified at least one user.

9. The method of claim 8, wherein the updating a schedule comprises rescheduling floors where each of the plurality of elevators stops based upon a predicted destination floor for the identified at least one user.

10. The method of claim 4, wherein the updating a schedule comprises rescheduling at least one of the plurality of elevators to prioritize at least one of the number of users waiting for an elevator.

11. An apparatus for optimizing schedules of a plurality of elevators in a building having a plurality of floors, comprising:
at least one processor; and
a computer readable storage medium having computer readable program code embodied therewith and executable by the at least one processor, the computer readable program code comprising:
computer readable program code configured to receive, from a user, an indication requesting that an elevator from the plurality of elevators stop at a particular floor, wherein each of the plurality of elevators has a schedule comprising floors where the elevator will stop;
computer readable program code configured to identify the number of users in the elevator waiting area of each of the particular floors where an indication requesting a stop has been received; and
computer readable program code configured to update, in view of the identified number of users at each of the particular floors, the schedule for the plurality of elevators to optimize the stops for the plurality of elevators, wherein the updating comprises dynamically routing the plurality of elevators upon (i) receipt of indications and (ii) identification of the number of users at each of the particular floors, wherein the dynamically routing occurs as the plurality of elevators are moving between floors and is further based upon (iii) the capacity of each of the plurality of elevators, (iv) the current number of users on each of the plurality of elevators, and (v) a schedule of another of the plurality of elevators.

12. A computer program product, comprising:
a computer readable storage medium having computer readable program code embodied therewith, the computer readable program code executable by a processor and comprising:
computer readable program code configured to receive, from a user in an elevator waiting area of a particular floor of a building, input requesting that an elevator stop at the particular floor, wherein the receiving comprises receiving, from an elevator application of a portable device, a request for the elevator, the request including information indicating the particular floor;
computer readable program code configured to add the particular floor to a stop schedule for the elevator;
computer readable program code configured to receive, after the particular floor has been added to the stop schedule for the elevator, input that the user has left the elevator waiting area before the elevator has stopped at the particular floor, thereby resulting in no users in the elevator waiting area; and
computer readable program code configured to remove, responsive to receiving the input that the user has left, the particular floor from the stop schedule before the elevator stops at the particular floor.

13. A computer program product for optimizing schedules of a plurality of elevators in a building having a plurality of floors, comprising:
a computer readable storage medium having computer readable program code embodied therewith, the computer readable program code executable by a processor and comprising:
computer readable program code configured to receive, from a user, an indication requesting that an elevator from the plurality of elevators stop at a particular floor, wherein each of the plurality of elevators has a schedule comprising floors where the elevator will stop;
computer readable program code configured to identify the number of users in the elevator waiting area of each of the particular floors where an indication requesting a stop has been received; and
computer readable program code configured to update, in view of the identified number of users at each of the particular floors, the schedule for the plurality of elevators to optimize the stops for the plurality of elevators, wherein the updating comprises dynamically routing the plurality of elevators upon (i) receipt of indications and (ii) identification of the number of users at each of the particular floors, wherein the dynamically routing occurs as the plurality of elevators are moving between floors and is further based upon (iii) the capacity of each of the plurality of elevators, (iv) the current number of users on each of the plurality of elevators, and (v) a schedule of another of the plurality of elevators.

14. The computer program product of claim 13, wherein at least one of (i) the receiving an indication of a user and (ii) the identifying a number of users is based upon at least one of: mobile application information, video image data, and information determined based upon identification of the user.

15. The computer program product of claim 13, wherein the updating a schedule comprises rescheduling floors where each of the plurality of elevators stops, thereby minimizing the number of stops for the plurality of elevators by transferring responsibility to stop at a particular floor from one of the plurality of elevators to another of the plurality of elevators.

16. The computer program product of claim 13, wherein the updating a schedule comprises rescheduling floors where each of the plurality of elevators stops, thereby minimizing an overall wait time for the plurality of users by transferring responsibility to stop at a particular floor from one of the plurality of elevators to another of the plurality of elevators.

17. The computer program product of claim 13, comprising identifying at least one user from the number of users and predicting a destination floor for the identified at least one user.

18. The computer program product of claim 17, wherein the updating a schedule comprises rescheduling floors where each of the plurality of elevators stops based upon a predicted destination floor for the identified at least one user.

* * * * *